May 4, 1965 T. E. BRANSCUM 3,182,108
EXTRUSION OF THERMOPLASTIC TUBING
Filed Jan. 14, 1963 3 Sheets-Sheet 1

INVENTOR.
T.E. BRANSCUM
BY Young & Quigg
ATTORNEYS

INVENTOR.
T. E. BRANSCUM

BY Young & Quigg

ATTORNEYS

May 4, 1965　　　T. E. BRANSCUM　　　3,182,108
EXTRUSION OF THERMOPLASTIC TUBING
Filed Jan. 14, 1963　　　　　　　　　　　　　　　　3 Sheets-Sheet 3

INVENTOR.
T.E. BRANSCUM
BY *Young & Quigg*
ATTORNEYS

United States Patent Office 3,182,108
Patented May 4, 1965

3,182,108
EXTRUSION OF THERMOPLASTIC TUBING
Tony E. Branscum, Bartlesville, Okla., assignor to Phillips Petroleum Company, a corporation of Delaware
Filed Jan. 14, 1963, Ser. No. 251,271
6 Claims. (Cl. 264—209)

This invention relates to a method and apparatus for use in the extrusion of tubing from thermoplastics such as polyethylene.

In the plastics fabricating industry it is the usual practice in making plastic tubing to extrude molten thermoplastic, such as polyethylene, through an annular die in the form of tubing, which is shaped to the desired size by a sizing tube or the like, and then to cool the extruded tubing, usually with water. In fabricating such plastic tubing, bubbles of air, steam or other gases and vapors are usually formed and cling to or collect on the extruded plastic tubing as it is cooled. As a result, these bubbles cause the plastic tubing to cool unevenly and give rise to surface defects, such as pockmarks, dimples, etc. Such surface defects are undesirable from the standpoint of appearance and also in some instances from the standpoint of serviceability, as, for example, in utilization of plastic tubing wherein a smoother surface produces a low pressure drop. These surface defects especially occur where the plastic tubing is cascaded or sprayed with water, or immersed in a water bath, and such defects become aggravated at high extrusion rates.

Accordingly, an object of this invention is to provide extruded thermoplastic tubing having an external surface which is smooth and free from surface defects, such as pockmarks, dimples, etc. Another object is to provide an improved method and apparatus for use in the extrusion of thermoplastics, such as polyethylene. Further objects and advantages of this invention will become apparent to those skilled in the art from the following description, appended claims and accompanying drawing, in which:

Briefly, according to this invention molten thermoplastic material is extruded through an annular die into a shaping zone, which is surrounded by a cooling zone or jacket into which a coolant such as water is passed, the extruded plastic tubing from the shaping zone is passed into a water bath or the like, and a liquid, such as the coolant from said cooling zone, is directed onto the plastic tubing as it issues from said shaping zone to sweep an extended portion of the external surface of the tubing and free it from or prevent the formation of bubbles of air, steam, etc., which may collect on the plastic tubing.

Figure 1:
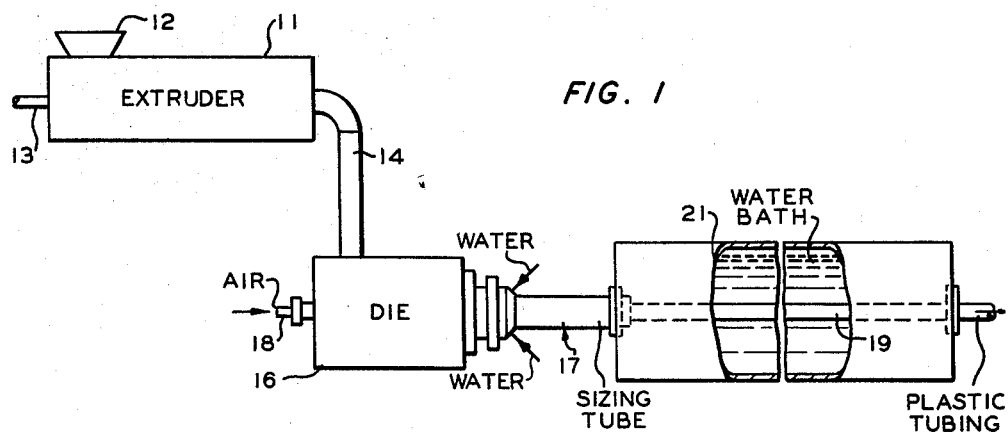
FIGURE 1 is an elevational view of apparatus used in the extrusion of thermoplastic tubing, with the improved apparatus of this invention associated therewith.

Referring now to the drawing, in which like parts have been designated by like reference numbers, and initially to FIGURE 1, reference number 11 designates a conventional extruder to which particulate themoplastic material, such as polyethylene, can be supplied by one or more hoppers 12. Extruder 11 is provided with suitable heating means to melt the thermoplastic material and it is passed to the right by the action of a screw or the like, which is rotated by means of shaft 13, connected to any suitable power source (not shown). The molten thermoplastic passes from extruder 11 via elbow pipe 14 into a die 16 from which it is extruded, through an annular opening, in the shape of a tube. The extruded tubing passes into a sizing means, disposed within means 17, for proper regulation of its dimensions. Air can be supplied by means of pipe 18, for purposes hereinafter described. The extruded plastic tubing 19 passes through a water bath 21 or the like, where it is solidified or set.

Figure 2:
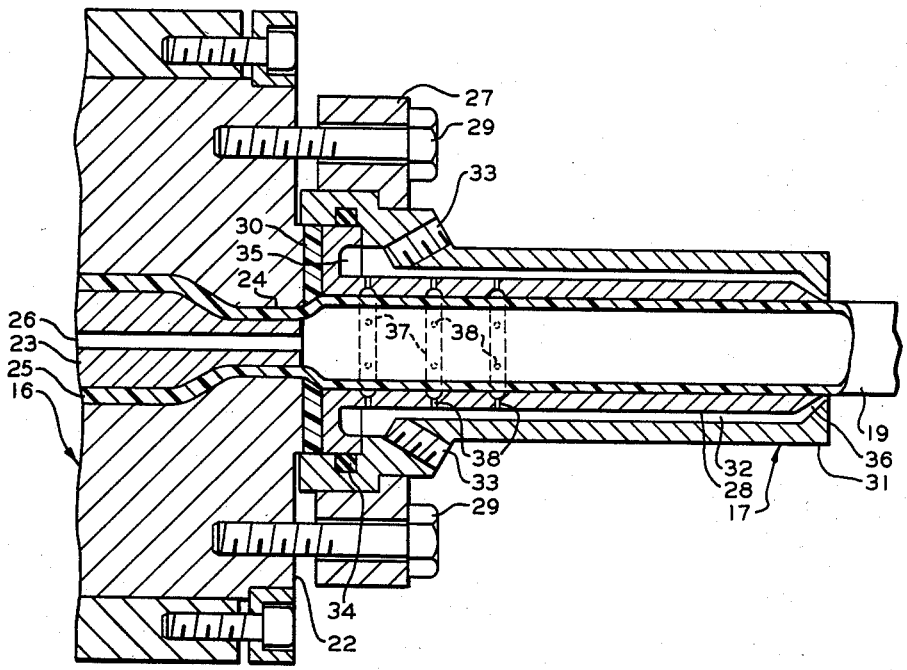
FIGURE 2 is an enlarged cross sectional view of the improved apparatus of this invention shown in FIGURE 1.

Referring now to FIGURE 2, where a preferred embodiment of this invention is illustrated, die 16 is provided with a bushing 22 which together with mandrel 23 defines an axial annular die opening or outlet 24 for the molten plastic 25. Mandrel 23 has an axial passage 26 for passage of compressed air or other fluid under pressure, which aids in maintaining the dimensions of tubing 19 as it is cooled in the water bath 21, as is well known in the art. Die 16 is provided with a collar 27 which holds in axial alignment with the die bushing 22 the improved means 17 of this invention by means of bolts 29. Means 17 is provided within its interior with a sizing tube 28 which serves to control the outer diameter of plastic tubing 19. A gasket 30, made of suitable material capable of withstanding high temperature, such as Teflon polytetrafluoroethylene, is disposed between the face of die bushing 22 and the downstream end of sizing tube 28. Surrounding sizing tube 28 is a cylindrical jacket 31 which is spaced a small disance from the sizing tube to provide an annular zone 32 which acts as a reservoir for coolant, such as water or the like, which can be supplied thereto by one or more inlets 33. A suitable O-ring or other suitable sealing means 34 can be provided between the upstream mating ends of sizing tube 28 and jacket 31. The annular zone 32 is provided with an enlarged portion 35 at its upstream end and with annular outlet 36 which tapered inwardly as shown at the downstream end of means 17.

Sizing tube 28 can be made of porous material, such as sintered copper, brass, ceramic, etc. Alternatively, sizing tube 28 can be provided with a plurality of small openings. For example, it can be provided on its inner surface with a plurality of spaced annular streamlined grooves 37, which grooves communicate by means of a plurality of small, circumferentially-spaced holes 38 with the annular coolant zone 32.

In operation, as the molten thermoplastic material 25 is extruded from the annular outlet 24 of die 16 into sizing tube 28, the latter shapes or forms the extruded plastic to the desired outer diameter, the so-shaped and sized tubing 19 issuing from the downstream or outlet end of the sizing tube then passing through the water bath 21 of FIGURE 1 or other similar means for solidifying and setting the thermoplastic tubing. Compressed air, supplied by pipe 18 of FIGURE 1, passes via passage 26 into the interior of plastic tubing, which can be sealed at some downstream point, e.g., by a clamp or the like, this air serving to maintain the desired thickness of the tubing wall. Water or other coolant is supplied to the annular zone 32 via inlets 33, and this coolant, through indirect heat exchange, cools the outer surface or skin of tubing 19 as it passes through the sizing tube 28, the enlarged annular portion 35 ensuring quick cooling of the plastic as it issues from die 16. The coolant in annular zone 32 is exhausted therefrom at a high velocity via annular outlet 36 in the form of a converging stream or spray directly onto the critical external surface of tubing 19 as it issues from the outlet end of sizing tubing 28. As such, the high velocity converging stream of water from outlet 36 sweeps an extended portion of the external surface of tubing 19 to dislodge or otherwise remove any steam bubbles, etc., which may have collected on the external surface of tubing 19 or to prevent the collection of such bubbles. The presence of such bubbles would, but for the annular converging stream of water, very likely collect on said external surface of the tubing due to formation of steam upon contact of the hot extruded tubing with the water in the water bath. Thus, by means of this invention the formation of surface defects, such as pockmarks, dimples, etc., on the external surface of the tubing is minimized or prevented.

The thermoplastic material which is extruded will often contain air, moisture or other volatile materials, and these gases or vapors oftentimes will come to the surface of the extrudate as it is being formed, causing surface defects. Formation of such defects due to such gases or vapors can be minimized or prevented by making the sizing tube porous, as described above, e.g. by making the sizing tube from sintered materials or providing the annular grooves with small holes mentioned above. As the extrudate moves past the openings in the sizing tube, the gases or vapors that may be trapped between the extrudate and sizing tube escape through the latter, and thus eliminate small bubbles of air, etc., which cause pockmarks or other defects. Such openings in the sizing tube should be small enough and the annular converging outlet of the external jacket of this invention should be large enough to prevent a pressure buildup inside the annular jacket which might force some of the coolant through the small vent holes in the sizing tube.

Figure 3:
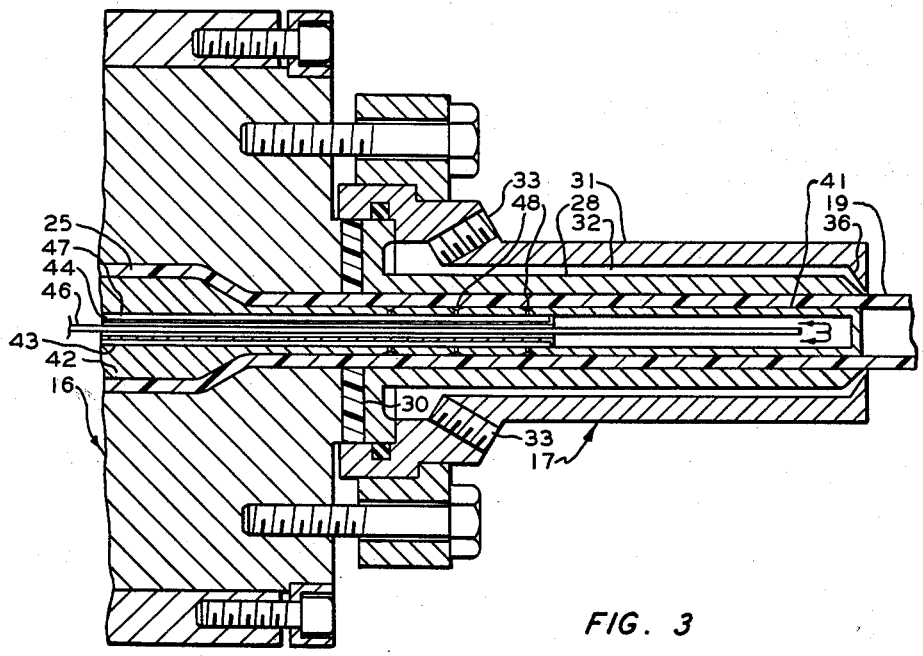
FIGURE 3 is a view like FIGURE 2 illustrating another embodiment of this invention.

Referring now to the embodiment shown in FIGURE 3, a sizing tube 41 is shown which is adapted to control the inner diameter of the plastic tubing and produce a smooth interior surface thereon. Sizing tube 41 can be an extension of mandrel 42. Mandrel 42 is provided with a large axial bore 43 in which are concentrically disposed pipes 44 and 46, the former being closed at its upstream end, and the latter being opened at its upstream end, as shown. The space between the outer surface of pipe 44 and bore 43 of mandrel 42 define a reservoir 47 which can serve as a vent manifold for any gases or vapor which escape from the extrudate as it passes through openings 48 in the internal sizing tube 41. Air or other coolant can be passed into pipe 46, in the direction shown by the arrows, which coolant is removed from the upstream end of the sizing tube 41. In other respects, means 17 shown in FIGURE 3 is like means 17 of FIGURE 2 and the same advantages are obtained by annular outlet 36, namely the minimizing or prevention of bubbles from collecting on the critical exterior surface of tubing 19 as it issues from means 17.

As an example, referring to FIGURE 2, a sizing tube 28 is constructed with an overall length of 4 in., a thickness of 1/8 in., and is provided with three spaced interior grooves 37 which are 1/16 in. deep, the first groove being 3/8 in. from the face of the die and the first and second grooves spaced 1/2 in. apart, as is the space between the second and third grooves. Each groove is provided with four vent holes 38 which are 1/8 in. apart and 0.020 in. in diameter. The sizing tube 28 is surrounded by a water jacket 31, the annular space 32 therebetween being 0.2 in., and the annular outlet 36 of this annular space being 0.05 in. Polyethylene having a density of 0.960 and a melt index of 0.2 is extruded at an extrusion speed of 16.6 ft. per min. from die 16 at 410° F. into the sizing tube 28 to form a 1-in. pipe. Air at 20 p.s.i. is supplied to the interior of the plastic tubing 19 and cool water at 50° F. is supplied to the jacket 32 at 50° F. The plastic tubing which is formed is free of any surface defects, due to the sweeping action of the annular converging stream of water issued from the water jacket directly on the plastic tubing as it issues from the sizing tube.

Various modifications and alterations of this invention will become apparent to those skilled in the art from the foregoing description and accompanying drawing without departing from the scope and spirit of this invention, and it should be understood that this invention is not to be limited unduly to that set forth herein for illustrative purposes.

I claim:

1. A method of extruding molten thermoplastic which comprises passing the latter from a die into a shaping passageway surrounded and confined by a cooling jacket, and directing a stream of liquid directly onto the resulting shaped thermoplastic article immediately as it issues from the confinement of said shaping passageway.

2. A method of extruding thermoplastic to form tubing therefrom, which comprises melting said thermoplastic, extruding the resulting molten thermoplastic through an annular outlet of a die, passing the resulting extrudate into a confining tubular shaping passageway to limit the size of the resulting plastic tubing, cooling the tubular extrudate in said shaping passageway by surrounding the latter with a jacket of water, passing the tubular extrudate into a water bath, and exhausting the water from said jacket in the form of an annular converging stream directly onto the resulting plastic tubing immediately as it issues from the confinement of said shaping passageway to prevent the collection of bubbles on said plastic tubing.

3. The method according to claim 2, further comprising removing vapors from said extrudate as it is passed through said shaping passageway.

4. Extrusion apparatus comprising means to extrude molten thermoplastic, means to mold the resulting extrudate in the form of a tubing, and cooling means surrounding and confining said extrudate, said cooling means having an opening to permit the passage of a liquid directly onto the resulting shaped thermoplastic article immediately as the latter issues from the confinement of said molding means.

5. Apparatus for extruding thermoplastic in the form of tubing, comprising means to melt said thermoplastic and extrude the resulting molten thermoplastic through an annular outlet of a die, tubular shaping means to receive the resulting extrudate, and a water jacket surrounding said shaping means, said jacket having an annular converging outlet adjacent the outlet end of said shaping means to direct water from said jacket directly onto the resulting plastic tubing immediately as it issues from said shaping means.

6. Apparatus according to claim 5, wherein said shaping means has an elongated passageway having a cross-sectional shape perpendicular to the longitudinal axis thereof corresponding to the shape of the article to be extruded and further having openings in its surface to pass vapors therefrom.

References Cited by the Examiner
UNITED STATES PATENTS 3,057,013 10/62 Loveless _____ 18—57 XR
3,095,608 7/63 Munsell _____ 18—55

ROBERT F. WHITE, *Primary Examiner.*

MORRIS LIEBMAN, ALEXANDER H. BRODMERKEL, *Examiners.*